(12) United States Patent
Kerschbaum et al.

(10) Patent No.: US 12,255,987 B2
(45) Date of Patent: Mar. 18, 2025

(54) SYSTEM AND METHOD FOR SECURE DETECTION OF SIMILARITY AND DISSIMILARITY OF EVENTS

(71) Applicants: Florian Kerschbaum, Waterloo (CA); John Abraham Premkumar, Waterloo (CA); Xinda Li, Waterloo (CA)

(72) Inventors: Florian Kerschbaum, Waterloo (CA); John Abraham Premkumar, Waterloo (CA); Xinda Li, Waterloo (CA)

( * ) Notice: Subject to any disclaimer, the term of this patent is extended or adjusted under 35 U.S.C. 154(b) by 232 days.

(21) Appl. No.: 18/070,738

(22) Filed: Nov. 29, 2022

(65) Prior Publication Data

US 2023/0171092 A1    Jun. 1, 2023

Related U.S. Application Data

(60) Provisional application No. 63/284,294, filed on Nov. 30, 2021.

(51) Int. Cl.
*H04L 9/08* (2006.01)
*G06F 21/62* (2013.01)
*H04L 9/32* (2006.01)

(52) U.S. Cl.
CPC .......... *H04L 9/085* (2013.01); *G06F 21/6209* (2013.01); *H04L 9/3242* (2013.01)

(58) Field of Classification Search
CPC .............................. H04L 9/085; G06F 21/6209
See application file for complete search history.

(56) References Cited

U.S. PATENT DOCUMENTS

| | | | |
|---|---|---|---|
| 11,082,220 B1* | 8/2021 | Saad | H04L 9/0894 |
| 2009/0136024 A1* | 5/2009 | Schneider | H04L 9/085 380/28 |
| 2018/0157703 A1* | 6/2018 | Wang | G06F 16/2453 |
| 2018/0278410 A1* | 9/2018 | Hirano | G06F 16/903 |
| 2020/0389306 A1* | 12/2020 | Dolan | H04L 9/3252 |
| 2021/0367786 A1* | 11/2021 | Sheets | H04L 9/0894 |
| 2022/0060319 A1* | 2/2022 | Patel | H04L 9/085 |

OTHER PUBLICATIONS

M. Kuzu, M. S. Islam and M. Kantarcioglu, "Efficient Similarity Search over Encrypted Data," 2012 IEEE 28th International Conference on Data Engineering, Arlington, VA, USA, 2012, pp. 1156-1167, doi: 10.1109/ICDE.2012.23. (Year: 2012).*

* cited by examiner

*Primary Examiner* — Robert B Leung
(74) *Attorney, Agent, or Firm* — Jeffrey Pearce

(57) ABSTRACT

Each of a plurality of clients encodes events as respective vectors and cooperatively choose a joint key. Each client then encrypts its event vector(s) using the joint key to form secret shares of a fixed value and then sends the encoded, encrypted vectors to a service-providing system that selects pairs of the vectors and determines a comparison value from a reconstruction of the secret shares. When the comparison value meets a predetermined criterion, the service-providing system generates a message indicating similarity between the selected pairs of the vectors. The service providing system thus determines a degree of similarity between the events without requiring knowledge of raw data about the events.

23 Claims, 3 Drawing Sheets

SYSTEM AND METHOD FOR SECURE DETECTION OF SIMILARITY AND DISSIMILARITY OF EVENTS

CROSS REFERENCE TO RELATED APPLICATIONS

This application claims priority of U.S. Provisional Patent Application No. 63/284,294, filed 30 Nov. 2021.

TECHNICAL FIELD

This invention relates to the determination of similarity and dissimilarity between events that can be represented in digital form.

BACKGROUND

Many common practical situations are not "binary", identical/different, yes/no, I/O, but rather display varying degrees of similarity. For example, different entities, such as different companies, different departments within a company or agency, might have respective copies of a data set that are in essence identical, but that differ by only a few words or metadata items, such that a strict binary comparison would indicate simply that they are not the same. As another example, two scans of the same finger or iris will in practice never indicate total digital bit-level identity. Similar issues arise in many other contexts as well, for example, data sets from different sources, personal identification information, texts up to a fixed length, computer/financial security/risk events, etc.

One disadvantage of many existing comparison schemes is that they reduce resolution (and hence implicitly security) to be able to provide a useful comparison at all. For example, assume that the coordinates of two versions of a physical signature are measured with 16-bit precision. The probability that the data sets representing the signatures will match bit-for-bit is infinitesimal Most systems therefore consider corresponding point pairs to "match" if their difference lies in some range, which means that less than 16 bits of precision are actually used; it also means that it is more likely that a fake signature will be accepted.

Yet another disadvantage of many existing methods is that they require or lead to leakage of information contained in the data sets being compared; this can be a serious drawback when the data sets include personal information.

In some situations, what is needed is a notion of similarity among the elements in compared data sets, such as in applications that identify similar events, for example biometric identification, entity resolution or record linkage. In some other situations, what is needed is implementation of a notion of dissimilarity of events, such as for intrusion or fraud detection.

DESCRIPTION OF THE INVENTION

Figure 1:
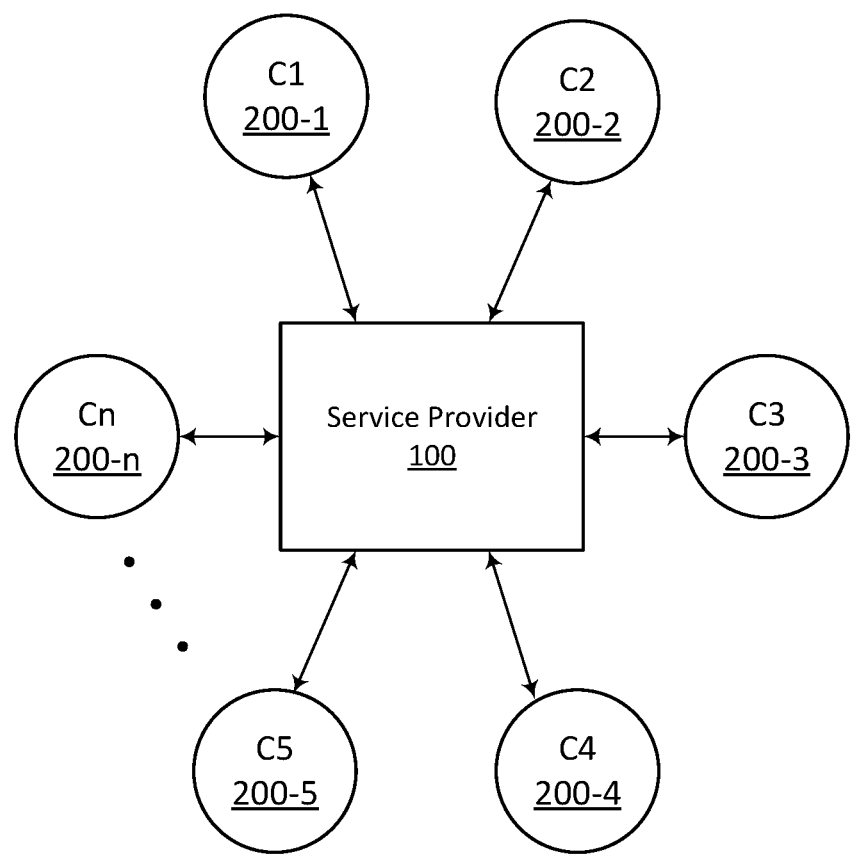
FIG. 1 illustrates a system for implementing similarity/dissimilarity detection.

In broadest terms, the invention provides a method and system implementation that enables comparison of representations of events submitted to a server by different entities ("clients"), without necessarily having to reveal anything about the underlying "raw" data itself.

As used here, an "event" is any data set, just a few examples of which are data at rest, such as stored files, data obtained from processing, data obtained by conversion of analog information or directly input in digital form from entities such as other computing systems, sensors, or even human users, etc. In other words, an "event" is anything—physical or logical—that can be represented in the form of a vector of elements, in which each element is a string of binary digits.

The data sets may represent the same thing, such as measurements of physical objects (for example, fingerprints, retinas or irises of eyes, images, etc.), but where the representations in digital form may in general not be identical, simply by the nature of the measurement process. The invention also comprises a method of coordination and communication between physical computing systems to carry out similarity or dissimilarity determination with at most negligible information leakage.

According to one feature of the invention, client systems $C_i$ (see FIG. 1) first encode elements of data sets to be compared into fixed-length vectors of integers, which preserves similarity, that is, the vectors are considered similar if and only if their elements are similar. Such encodings already exist for several types of data, for example, text (BERT), database records (Record2vec), or names (Name2vec). Such encodings can also be trained for other types of data using machine learning. An autoencoder may then generate a latent representation of an input that is the required vector and comparable under a given distance metric, e.g., the L1 distance. If no encoding for the data type is available, one may instead train an autoencoder given the availability of sufficient training data.

After encoding the data the respective client encrypts it to protect its content from disclosure but in such a way that similarity comparison over the encrypted data is enabled. To accomplish this, embodiments employ an approximate equality operator, which can then be used to build applications, such as for anomaly detection or record linkage. For anomaly detection, the invention—in particular, a server or "service provider" 100 (see FIG. 1)—first clusters the data elements based on approximate equality and then determines anomalies based on cluster features, such as cluster size. For record linkage, in one embodiment, the server looks for approximately equal data elements and outputs them as linked. Embodiments may use different similarity thresholds but still use approximate equality comparison at their core.

Embodiments may operate with two different types of entities, each of which may comprise more than one party/system. One entity type (a "client" 200) supplies encrypted data elements and the other entity type (the service provider 100) compares encrypted elements. The entity/-ies performing the comparison will learn the result of each comparison, i.e., whether two elements are similar or not, but nothing substantial beyond that. They may share this information with the parties supplying the encrypted elements, or only the result of additional analyses after those comparisons.

Embodiments use a novel, secure, approximate equality operator, which takes, as inputs, integer vectors $\vec{x}$ and $\vec{y}$. The approximate equality operator first evaluates a similarity function (an inverse distance) $s(\vec{x}, \vec{y})$ between $\vec{x}$ and $\vec{y}$ and then compares $s(\vec{x}, \vec{y})$ to a threshold t. If $s(\vec{x}, \vec{y}) \geq t$, then the operator outputs (approximately) "equal"; otherwise, it outputs "not equal". A preferred relationship enabling determination of the threshold t, is described below.

The secure approximate equality operator reduces the information revealed about the vectors $\vec{x}$ and $\vec{y}$. For an ideally secure operator, the party executing the operator should learn only the result, i.e., "equal" or "not equal", but nothing else. This implies that the party executing the operator does not learn the plain vectors $\vec{x}$ and $\vec{y}$, but rather only some transformed form of the vectors that the party cannot reverse. In one embodiment, the secure approximate equality operator works in a relaxed security model, where no information about $\vec{x}$ and $\vec{y}$ is revealed if the output is "not equal" but some information is revealed if the output is "equal".

Two types of information may possibly be leaked: 1) more precise information about where two vectors are similar/dissimilar, for example, element indices where they are the same/differ, and 2) information about the encryption, which may, depending on the chosen encryption scheme, be used to recover information such as 1) about other vectors. This leakage can be contained, however, by re-keying the equality operator, that is, the parties choose a new key to use for subsequent vector pairs. This re-keying causes information such as 1) to be lost, but information 2) becomes useless. This embodiment has the advantage that it is much faster than known ideally secure operators.

Formalization

Let $\lambda$ be a security parameter that bounds a computational adversary, that is, $\lambda$ is such that an adversary is not able to defeat the scheme given limited computational resources. The secure approximate equality operator consists of three, possibly probabilistic, polynomial-time operations:

K←KeyGen($1^\lambda$): generates a (symmetric) key K using the security parameter $\lambda$.

$\vec{c}$←Encode(K; $\vec{x}$; t): generates a transformed ciphertext $\vec{c}$ for vector $\vec{x}$ and threshold t.

T/⊥←Compare($\vec{c}_1$, $\vec{c}_2$): outputs "equal" (T) or "not equal" (⊥) given two transformed vectors $\vec{c}_1$ and $\vec{c}_2$.

A secure approximate equality operator is correct, if $\forall \lambda, \vec{x}, \vec{y}, t$ K←KeyGen($1^\lambda$)

$\vec{c}_1$←Encode(K, $\vec{x}$, t)

$\vec{c}_2$←Encode(K, $\vec{y}$, t)

$\Pr[s(\vec{x}, \vec{y}) < t \wedge \text{Compare}(\vec{c}_1, \vec{c}_2) = T] = \text{negl}(\lambda)$ $\Pr[s(\vec{x}, \vec{y}) \geq t \wedge \text{Compare}(\vec{c}_1, \vec{c}_2) = \#] = \text{negl}(\lambda)$ In words, if the original vectors $\vec{x}$, $\vec{y}$ are not sufficiently similar, then the likelihood that the comparison function Compare indicates that their encoded transformations are equal should be nil (the ideal case), or at most negligible (negl); conversely, if $\vec{x}$ and $\vec{y}$ are sufficiently similar, the probability that Compare indicates they are not should also be nil or at most negligible. In short, there should be at worst a negligible probability of a "false positive" or "false negative". The acceptable probability of failure is determined by the parameter $\lambda$, which the system designer may choose according to the degree of probability of failure deemed acceptable in any given implementation of the invention.

Without loss of generality, one could formulate these statements with respect to distance instead of inverse distance, that is, set the threshold relative to similarity rather than dissimilarity. The term "similar" as used herein should therefore be taken to mean even "dissimilarity" inasmuch as the procedures to determine either are essentially the same, such that dissimilarity can be considered a form of "negative similarity".

Let $\mathcal{L}(\vec{x}, \vec{y})$ be the information about $\vec{x}$ and $\vec{y}$ leaked by executing the secure approximate equality operator and denote computational indistinguishability of two ensembles $E_1$ and $E_2$ as $E_1 \stackrel{\text{def}}{=} E_2$. We say an approximate equality operator is $\mathcal{L}$-secure, if there exists a simulation function (a "simulator") Sim($\mathcal{L}(\vec{x}, \vec{y})$) such that $\forall \vec{x}, \vec{y}, t$ K←KeyGen($1^\lambda$)

$\vec{c}_1$←Encode(K, $\vec{x}$, t)

$\vec{c}_2$←Encode(K, $\vec{y}$, t)

Sim($\mathcal{L}(\vec{x}, \vec{y})$) $\stackrel{\text{def}}{=}$ Compare($\vec{c}_1, \vec{c}_2$)

In words, the simulator Sim, which is a function of leakage $\mathcal{L}(\vec{x}, \vec{y})$, which in turn is a function of the "raw" information in $\vec{x}$, $\vec{y}$, should produce the same output as Compare, which is a function of the encoded information in $\vec{x}$, $\vec{y}$, that is, of $\vec{c}_1$, $\vec{c}_2$. This implies that Compare cannot leak more information than the simulator Sim is given.

Let $x_i$ be the i-th entry of vector $\vec{x}$ and $y_i$ be the i-th entry of vector $\vec{y}$. Let $H_{K_i}(\bullet)$ be a keyed, one-way transformation function, for example, a message authentication code (MAC). Let n be the length of vectors $\vec{x}$ and $\vec{y}$. As used in one embodiment of the invention, an approximate equality operator is relaxed secure, for the specific leakage function $\mathcal{L}*$:

$$\mathcal{L}^*(\vec{x}, \vec{y}) = \begin{cases} [T, i, H_{K_i}(x_i), H_{K_i}(y_i)] \forall i \mid x_i \neq y_i & \text{if } s(\vec{x}, \vec{y}) > 2t - n \\ \perp & \text{otherwise} \end{cases}$$

$\mathcal{L}*$ thus returns at least four pieces of information in the case (and only in the case) two event vectors exceed the similarity threshold of 2t−n, namely, the "equality" indication T, as well as the indices of non-matching elements and the values of the transformation functions of non-matching vector element pairs. The indicators T/⊥ are the outputs as such, whereas the other values are inferable from the computation.

The leakage property reflects a tradeoff that leads to much greater efficiency than functional (inner-product predicate) encryption. What is leaked (not the output as such) is a part of the encryption key where the elements differ. The H( ) values are derived from the encryption key and, if they are available, for all i and $x_i$, they are sufficient to encrypt or decrypt an input. The keys are leaked if the input differs in some, but few (determined by the chosen threshold), indices i, such that they still are recognized as similar but not identical. If, however, there is insufficient information to determine similarity, then no information about the keys is leaked.

This "relaxed" leakage function $\mathcal{L}^*$ has properties that differ from the "binary" leakage function $\mathcal{L}$ described above. First, $\mathcal{L}^*$ provides information in addition to the solely binary T/⊥ information, but only in case of a match; otherwise, no additional information is revealed. More particularly, $\mathcal{L}^*$ includes the two types of leakage information mentioned above in that i corresponds to leaked information type 1) and the rest of the expression corresponds to leaked information type 2). Second, in one specific instance of encoding/leakage, an attacker would be able to recover the leakage in case s>2t−n, but some methods that run in polynomial time, such as the known Berlekamp-Welch algorithm, would be able to recover the match only if s>t since they would need additional information, whereas the worst-case attack may require exponential time in n. Other polynomial-time algorithms, such as known list decoding methods, which, instead of outputting a single possible message, output a list of possibilities which "successful decoding" is when one of which is correct), may, however, under some circumstances, be able to recover a match for the case s>t' where t'<t.

As is well known in the field of cryptography, a message authentication code (MAC) is a cryptographic function of input data that uses a session key to detect modifications of the data. The simplest version of a MAC takes two inputs: a message and a secret key and generates an output that is sometimes referred to as a "tag". The MAC is non-invertible, that is one-way, meaning that one cannot determine the input message from the tag, even if one knows the secret key used in generating the tag. On the other hand, given the same inputs, a standard MAC is repeatable, that is, given the same inputs it will generate the same output. It is also collision resistant, meaning that it is computationally very difficult to find two dissimilar inputs that lead to the same MAC output. A verifier who also possesses the key can thus use it to detect changes to the content of the message in question. In most common uses of a MAC, the MAC routine itself generates the secret key for a message. In embodiments of the invention here, however, the clients 200 select the key to be used when transmitting their messages for comparison.

Let $MAC_K(\cdot)$ be a message authentication code using key K and denote the key generation function for the message authentication code $MAC_K(\cdot)$ as $KeyGen_{MAC}$.

To implement the encoding, embodiments may, for example, use linear error-correcting codes, e.g., Hamming or Reed-Solomon codes, as described in more detail below. A codeword in a Reed-Solomon code may be used as a secret share in the known Shamir secret-sharing scheme. For simplicity, an embodiment is described below that uses Shamir's secret shares, but any codewords from a linear error-correcting code could be used instead.

As a summary, Shamir's scheme builds on the observation that a polynomial of degree m≤n may be uniquely determined given the values of any set of at least n+1 distinct points that satisfy the polynomial expression. For example, knowledge of three distinct points that lie on a parabola is sufficient to completely determine the parabola. If more than n+1 distinct points are provided, however, then any set of n+1 of these may be used to determine the polynomial even if the other points remain secret. At the same time, knowledge of fewer than n+1 values will leave the polynomial undetermined and provide no more information than knowledge of no points at all, or random numbers.

More formally, let $SS_{\tau,s}(z)$ be the polynomial $\Sigma_{i=1}^{\tau} \alpha_i z^i + m$ over group $\mathbb{G}$ as used in Shamir's secret sharing to generate secret shares for identifier z and secret m. Given τ+1 secret shares from the same polynomial $SS_{\tau,s}(z)$ one can reconstruct secret m, for example, efficiently using Lagrange interpolation, but τ shares are indistinguishable from τ uniformly random numbers in $\mathbb{G}$. Given n secret shares, where $t = \lceil \tau(n-\tau)/2 \rceil$ are from the same polynomial $SS_{\tau,s}(z)$ and $\lfloor (n-\tau)/2 \rfloor$ are not, one can reconstruct z in polynomial time using Berlekamp-Welch's algorithm. (As is conventional, ⌈ and ⌊ represent the ceiling and floor functions, respectively.) It follows that n≥t>n/2 must hold. Other decoding algorithms for Reed-Solomon codes, such as list decoding, mentioned above, may also be used. For linear error-correcting codes other than Reed-Solomon codes, one must use the corresponding error-correcting recovery algorithm.

Now recall the condition in the definition of $\mathcal{L}^*$, that is, $s(\vec{x}, \vec{y}) > 2t-n$, as well as the expression $t = \lceil (n-\tau)/2 \rceil = \lceil \frac{1}{2}(\tau+n) \rceil$ relating to the Shamir secret shares shown above. In this embodiment, the threshold t may thus be determined as a function of τ+n.

Shamir's secret sharing is linear (as the error-correcting code is linear). Given secret shares $\sigma = SS_{\tau,s}(z)$ and $\sigma' = SS_{\tau,s'}(z)$, then $\sigma + \sigma' = SS_{\tau,s+s'}(z)$. Given al secret shares from $SS_{\tau,s+s'}(z)$ one can reconstruct the sum of the corresponding secrets m+m'.

Now let $\mathbb{1}(\alpha, \beta)$ be the equality function, i.e., $\mathbb{1}(\alpha, \beta) = 1$ if $\alpha = \beta$ and 0 otherwise. The secure approximate equality operator may then implement the following similarity function s.

$$s(\vec{x}, \vec{y}) = \Sigma_{i=1}^{n} \mathbb{1}(x_i, y_i)$$

One way to define the secure approximate equality operator is as follows:

KeyGen($1^\lambda$): Execute $K \leftarrow KeyGen_{MAC}(1^\lambda)$ and output K.

Encode(K, $\vec{x}$, t): Let m and m' be messages. Create n codewords from a linear code, e.g., Shamir's secret shares (SS) $\sigma_i$ for Reed-Solomon codes, $\sigma_i = SS_{2t-n,m}(i)$ and $\sigma'_i = SS_{2t-n,m'}(i)$ for 1≤i≤n. Output the vectors $\sigma_{x,i} = \sigma_i + MAC_{MACK(i)}(x_i)$ and $\sigma'_{x,i} = \sigma'_i - MAC_{MACK(i)}(x_i)$ Compare($\vec{\sigma}_x$, $\vec{\sigma}'_y$): Compute $\rho_i = \sigma_{x,i} + \sigma'_{y,i}$. Reconstruct m+m' from $\rho_i$. If the reconstruction is successful, output T and optionally m+m', else ⊥.

Correctness: If $x_i = y_i$, then $MAC_{MACK(i)}(x_i) = MAC_{MACK(i)}(y_i)$ and $\rho_i$ is a correct secret share on a polynomial $SS_{2t-n,m+m'}(z)$. Hence, if at least t elements $\rho_i$ are correct secret shares, then reconstruction of m will be successful. However, if $x_i \neq y_i$ then $\rho_i$ is uniformly distributed in G. If more than n−t elements $\rho_i$ are uniformly random, then reconstruction of m will be unsuccessful.

Relaxed Security: The leakage $\mathcal{L}^*(\vec{x}, \vec{y})$ is sufficient to simulate the secure approximate equality operator; here, the term "simulate" is used in the sense that there exists a simulation function $Sim(\mathcal{L}^*(\vec{x}, \hat{y}))$ that produces an output that an adversary cannot distinguish from a real execution, i.e., the defender simulates a real execution (without using the secret information). If at most 2t−n elements in the vector are equal, then at most 2t−n secret shares are on the polynomial $SS_{2t-n,m+m'}(z)$ that are indistinguishable from uniform random numbers. Since the other elements are not equal, their secret shares are also indistinguishable from random numbers. Hence, the entire vector is indistinguishable from random numbers. If more than 2t−n elements in the vector are equal, then the reconstructor learns $\rho_i = \sigma_i + \sigma'_i + \text{MAC}_{MACK(i)}(x_i) - \text{MAC}_{MACK(i)}(y_i)$ and the recovery (for example, using Berlekamp-Welch's) algorithm also outputs $\sigma_i + \sigma'_i$. The leakage $\mathcal{L}^*(\vec{x}, \vec{y})$ includes $\text{MAC}_{MACK(i)}(x_i) - \text{MAC}_{MACK(i)}(y_i)$. The secret share $\sigma_i + \sigma'_i$ is identically distributed to a random secret share $SS_{2t-n,m}(i)$.

The invention thus combines encryption of the original data sets $\vec{x}$ and $\vec{y}$ with a secret-sharing procedure. This enables the system to compare the data sets without revealing them, with partial revealing of information only when the data sets have been determined to be sufficiently similar.

System Implementation

FIG. 1 shows a system for implementing the similarity/dissimilarity detection mechanism described formally above. As FIG. 1 shows, the system as a whole comprises a server 100, that is, a Service Provider or "comparison server", and a number n of clients 200-1, . . . 200-n, each of which (including the server 100) comprises a physical and/or virtual computing system. In the most anticipated configuration, all or most of the clients will comprise a separate computing platform, although this is not strictly necessary—note that a single physical platform might host multiple instances of virtual machines, each of which could act as a client. Both the server 100 and the clients include standard components such as system hardware with at least one processor, volatile and/or non-volatile memory and/or storage, standard I/O components as needed to enable communication with other entities and systems over any known type of network, wireless or wired. Some form of system software will also typically be included, such as an operating system and/or virtual machine hypervisor. Processor-executable code organized as software modules may be used to carry out the various computations and functions described below and may be stored and thus embodied in either or both types of memory/storage components. These software modules will thus comprise processor-executable code that, when run by the respective processor(s), cause the respective processor(s) to carry out the corresponding functions.

The client(s) and server communicate among themselves over any conventional wired or wireless network using a preferably secure and authenticated channel, one example of which is the known Transport Layer Security (TLS) cryptographic protocol.

In a key agreement phase, the clients communicate among each other to choose a common secret key. In a simple implementation, one client may choose the key and distribute it to the other clients.

Any known method may be used to choose which client is assigned/allowed the task of proposing a key. One method could be simply the first client to submit a key to the others. Another method would be to choose the client whose identifier, for example, MAC or other address or identifier, when used as an input to an agreed upon randomizing function, produces an output that meets some selection criterion, such as being the lowest or highest or closest to some other value. If the set of clients is fixed, they could takes "turns" choosing the current key, following a predetermined order.

It would also be possible to allow multiple clients to choose the current key, including key agreement protocols, such as the well-known Diffie-Hellman scheme or its variants for multiple parties. Multiple keys might also arise in a first-to-propose scheme as a result of network delay. In such cases, any consensus mechanism may be implemented in order for the clients to come to agreement concerning which is to select the current key.

In still other systems, the clients may be subordinate to some administrative system, which itself chooses which client should select the current key, using any criteria the system designer chooses to implement. The server 100 could also be called upon to select which client is to choose the current key, although this might raise a concern about possible "collusion".

After key agreement comes an analysis phase in which the clients send their encoded data to the server for similarity or dissimilarity detection. The security objective is that the server learns whether two events are similar or dissimilar but nothing else about the events encoded in the data.

In case similar events leak additional information, a fresh key can be chosen by the clients after at least one similar pair of events has been discovered by the server. This reduces the accumulated leakage of multiple similar pairs of events.

Figure 2:
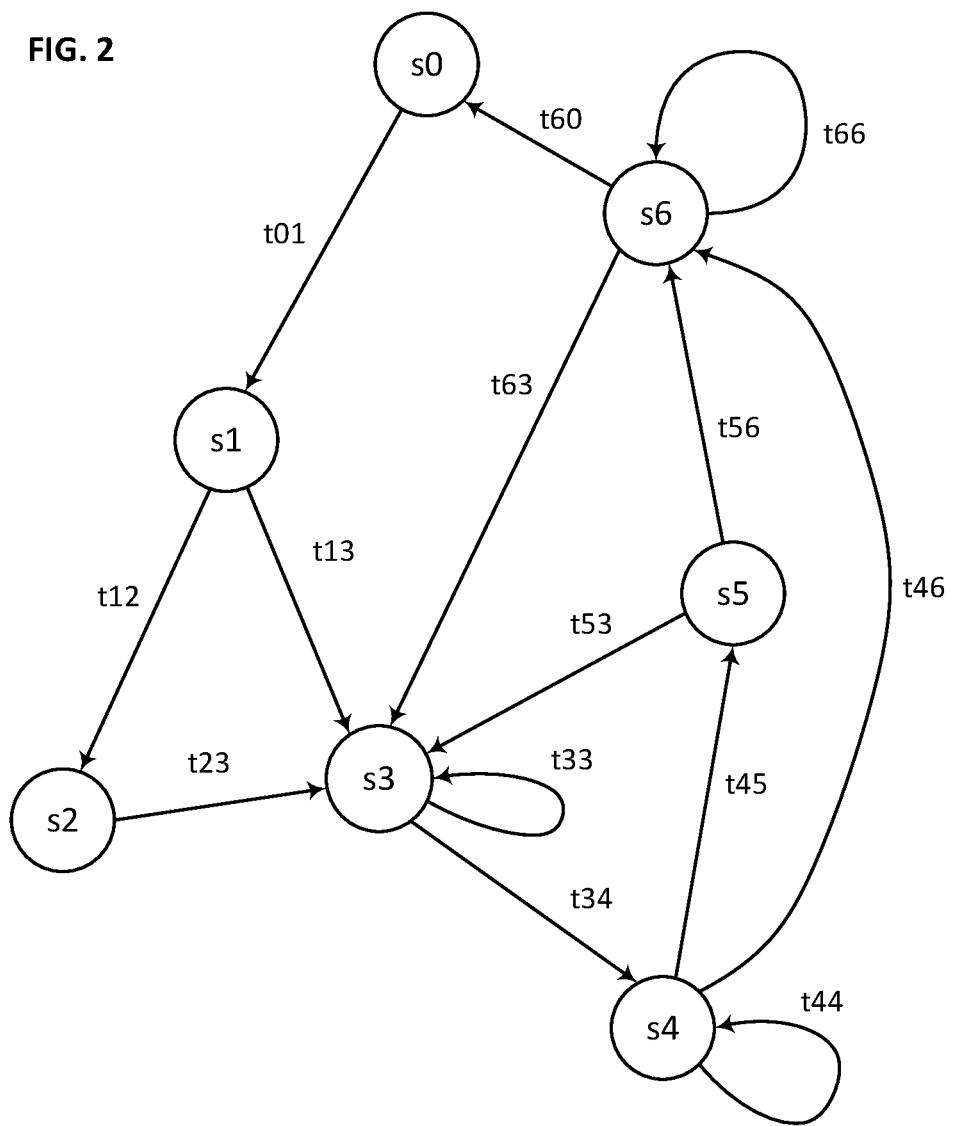
FIGS. 2 and 3 are state diagrams that show the messages and states of a client and a service-providing system, respectively, according to one embodiment, during execution of a protocol for determining similarity/dissimilarity of events.
Figure 3:
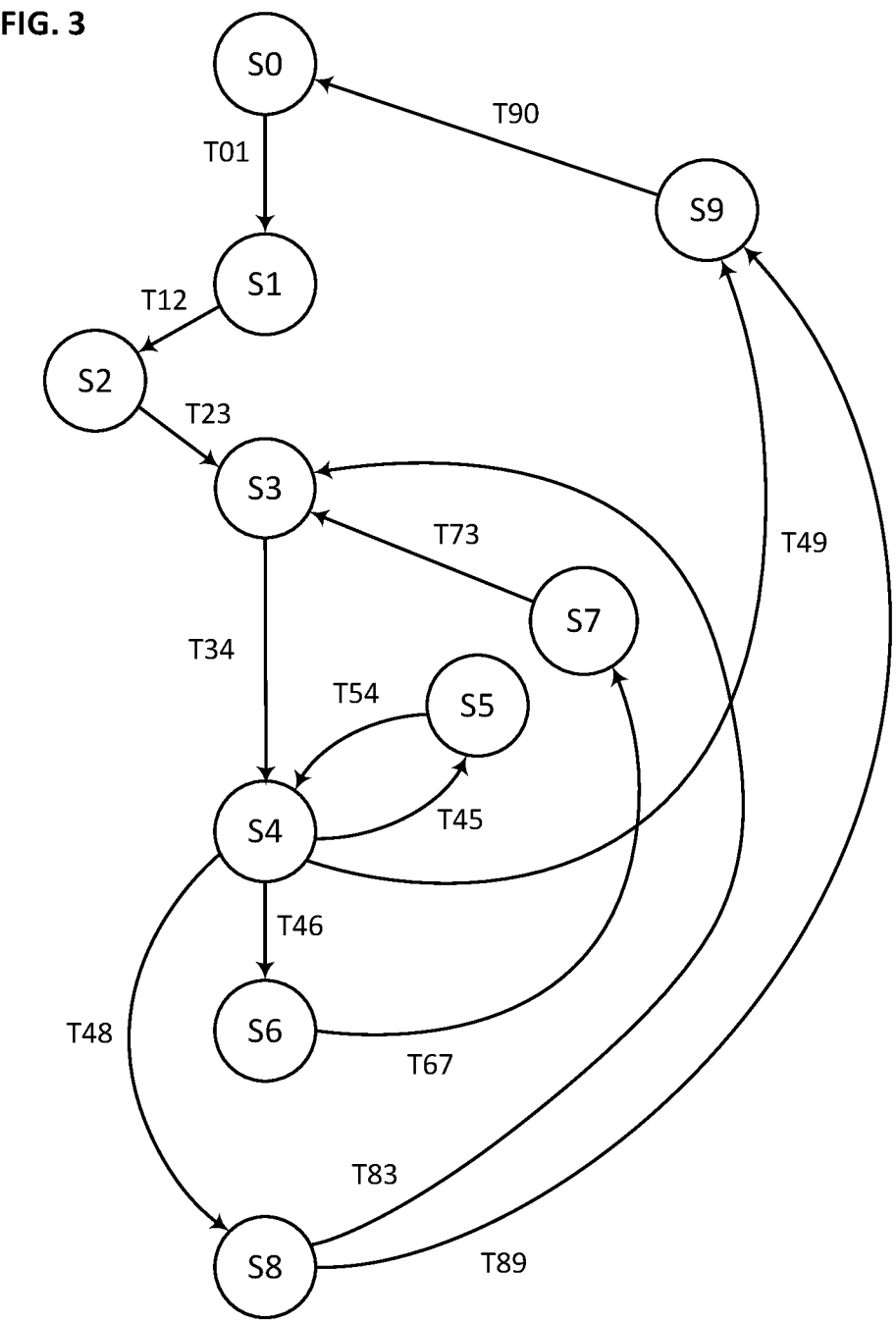

FIG. 2 and FIG. 3 are state diagrams that show the messages and state of a client Ci and the server 100, respectively, during this protocol:

In FIG. 2, "circles" indicate Client states s0-s6 and arrows labeled with the convention tij indicate transitions (and/or messages transmitted) from state i to state j; thus, for example, t23 indicates a transition from state s2 to state s3. State s0 simply indicates the state of a client at the beginning of a session.

Let m1-m8 indicate the following messages:
 m1: ready for session, metadata for all clients, that is, the metadata that specifies all the clients that are to participate in the current session
 m2: key exchange
 m3: match, messageID of match, endFlag (default=0)
 m4: End session
 m5: end of records
 m6: start key exchange protocol
 m7: key exchange/derivation done
 m8: send records In states s1, s2, and s3, various operations are to be carried out:
 s1: Send m1 to service provider
 s2: Send m6 to other client(s)
 s3: Execute key exchange/derivation and send m7. Key exchange is performed when the previous state is s1 or s2; key derivation otherwise.

The state transition conditions and actions of the client in this example are as follows:
 t01: When the client has a record to match
 t12: m2 received
 t13: m6 received
 t23: null
 t33: m3 received. The loop is required because the keys need to be derived even for clients that are not yet participating in the matching, when there is a match, so that the key remains updated
 t34: m8 received
 t44: send record
 t45: m3 received
 t46: Send last record along with m5
 t53: The client has a record to match
 t56: No more records
 t60: m4 received
 t63: m3 received
 t66: m3 received, endFlag==1

FIG. 2 depicts states Sx (x=0-6) and state transitions of the Service Provider in one prototype embodiment, where S0 is the initial state and, following the previous convention, Tij indicates a transition from state i to state j. Let n be the total number of participating clients, as specified in m1 metadata and Ck indicate client k.

The state transition conditions and in-state actions of the client in this example are as follows:

T01: m1 received from all clients
T12: Send m2 to C1
T23: null
S3: Set i:=i+1 and send m8 to C1, . . . , Ci
T34: C1 to C(i−1)'s m5 received
S4: Listen for records and perform matching
T45: Matching is done; m5 is received from Ci; i<n
T46: Match occurs; C1 to C(i−1) have been iterated
T48: Match occurs on the last record, C1 to C(i−1) have all been iterated
T49: Matching is done and m5 is received from Cn
S6: Send m3 to all clients discard all received records.
S8: Set m3 to endFlag=1; send m3 to clients; discard all received records. As an alternative, this step may of generating and sending m3, and discarding records, may comprise waiting until some predetermined number or percentage of matching pairs have been accumulated
T67: Null
S7: i:=i−1 Note that this decrements i, which is then incremented in S2. This is because i should not be changed in S2 when m5 has not been received
T83: i<n
T89: i=n, that is, m5 was received from Cn
T90: End of session The server 100 can collect metadata about the encoded data, for example, source client, arrival time, etc. This information can be used in decisions about events comprised of multiple similar encoded data, for example, clusters.

Application areas where detection of similar or dissimilar data is necessary include but are not limited to private record linkage (PRL) or private anomaly detection (PAD) (e.g., of cybersecurity events). As mentioned above, however, the invention may be used on many other fields as well. The action(s) the clients—or any other concerned entity—chooses to take in Determination of to the server's determination of similarity/dissimilarity will be equally varied. A determination of similarity/dissimilarity to at least the specified degree will, for example, have different interpretations in different use cases. In some cases a remedial action may be taken, such as granting or removing authorization for the clients to access or do something.

In PRL two or more parties have databases or portions of databases about the same entities (e.g., persons visiting a hospital). The records for the same entity are similar but may differ in the exact data, for example, due to data entry errors or format differences—Bob C. Parker and Bob Parker may refer to the same entity—and the schema. The goal of PRL is to identify similar entities but not reveal anything about dissimilar entities. The invention is well-suited to performing PRL.

In PAD, two or more parties have a stream of events, some of which are dissimilar to the clients' normal behavior but similar among clients. This might, for example, be system events resulting from a (concerted) cybersecurity attack on multiple clients. The goal would then be to identify the similar events across clients and report them as a cluster. An example cybersecurity attack could be credential stuffing attacks where attackers attempt the same username/password pair across multiple clients.

Before comparing data for similarity or dissimilarity, as mentioned above, the data is preferably encoded into fixed-length vectors. The distance metric used for similarity or dissimilarity detection may be known at encoding time; any conventional distance metric may be used, some of which are mentioned above.

Encoding may be performed using machine learning (ML). In ML there is a training phase and an inference phase. Data from an expected distribution, that is, training data, should be known. Using this data, a ML model may be trained in any known manner, such as a neural network being trained using contrastive learning.

In case of anomaly detection, a further preprocessing step may be applied. First, an encoder-decoder network may be trained using the normal data. This network is then fed normal and previous anomalous events. Anomalous events not used during the training will tend to have a high decoder reconstruction error, which may be used as the training data for a subsequent ML model trained using contrastive learning as before. During operation of the system, the inference of the ML used. The clients' data will then be fed into the model (including the encoder-decoder network for anomalous events). The output is the encoding that will be protected by the key and sent to the server.

The invention claimed is:

1. A method for securely detecting similarity and dissimilarity between events, comprising:
    in a service-providing system:
        inputting from a plurality of clients a plurality of vectors, each vector being an encoded and encrypted ordered data set and being a digital representation of one of the events, each of said plurality of clients having chosen a joint key, encoded their respective vectors, and, using the joint key, encrypted their respective vectors as secret shares of a fixed value;
        selecting pairs of the vectors and determining a comparison value from a reconstruction of the secret shares;
        when the comparison value meets a predetermined criterion, generating a message indicating similarity between the selected pairs of the vectors;
        whereby the service providing system determines a degree of similarity between the events without requiring knowledge of raw data about the events.

2. The method of claim 1, further comprising evaluating an approximate equality function having, as input, pairs of the vectors, elements of said vectors being integers, by evaluating a similarity function between the vector pairs, comparing the similarity function to a threshold value, and outputting a value representing at least approximate equality only when the similarity function has a predetermined relationship to the threshold.

3. The method of claim 2, further comprising evaluating the approximate equality function in a relaxed mode, in which information about the inputted vectors is leaked only when the approximate equality function indicates equality.

4. The method of claim 2, in which the step of determining the comparison value comprises clustering elements in the inputted vectors by evaluating the approximate equality function and determining anomalies based on cluster features.

5. The method of claim 2, in which the step of determining the comparison value comprises determining approximately equal data elements of the inputted vectors and indicating that the approximately equal data elements are linked, thereby enabling Private Record Linkage (PRL).

6. The method of claim 2, in which the vectors are encoded from a predetermined number n of codewords, each of which forms a respective message, of a linear code as a function of a message authentication code (MAC) keyed using the joint key.

7. The method of claim 6, in which the predetermined number n of codewords are Shamir secret shares of a Reed-Solomon code and the vectors are encoded as the sum of respective ones of the secret shares and the message authentication code, further comprising attempting determination of the comparison value as a function of a sum of the messages and indicating equality when the reconstruction is successful.

8. The method of claim 1, in which the vectors are encoded using a linear error-correcting codes.

9. The method of claim 8, in which the vectors are encoded using Shamir secret sharing.

10. The method of claim 1, in which the predetermined criterion is that more than a minimum number of ordered element pairs in pairs of the vectors are identical.

11. The method of claim 10, in which the minimum number is 2t−n, where t is a selectable threshold value and n is the number of elements in each vector.

12. The method of claim 8, further comprising determining the comparison value by applying list decoding.

13. A method for securely detecting similarity and dissimilarity between events, comprising:
in each of a plurality of clients:
encoding each event in digital form by converting each event into a respective vector comprising an ordered set of elements, each element comprising a binary string;
in cooperation with at least one other of the clients, choosing a joint key;
encrypting the vector using the joint key to form secret shares of a fixed value;
transmitting the encoded, encrypted vector to a comparison server, said comparison server then selecting pairs of the encoded, encrypted vectors submitted from the clients and determining a comparison value from the secret shares such that, when the comparison value meets a predetermined criterion, the comparison server generates a message indicating similarity between the selected pairs of the encoded, encrypted vectors, the comparison server thereby determining a degree of similarity between the events without requiring knowledge of raw data about the events.

14. The method as in claim 13, in which the step of encoding comprises converting the respective vector elements using a linear error-correcting code.

15. The method as in claim 14, in which the respective vector elements form the secret shares according to a Shamir secret-sharing scheme.

16. The method as in claim 13, in which the determination of the comparison value comprises reconstruction of the secret shares.

17. The method of claim 13, in which the determination of the comparison value comprises evaluating an approximate equality function having, as input, selected pairs of the encoded, encrypted vectors, by evaluating a similarity function between the vector pairs, comparing the similarity function to a threshold value, and generating a value representing at least approximate equality only when the similarity function has a predetermined relationship to the threshold.

18. The method of claim 17, in which the determination of the comparison value comprises evaluating the approximate equality function in a relaxed mode, in which information about the vectors is leaked only when the approximate equality function indicates equality.

19. The method of claim 17, in which elements determined to be approximately equal are linked, thereby enabling Private Record Linkage (PRL).

20. The method of claim 13, in which the vectors are encoded from a predetermined number n of codewords, each of which forms a respective message, of a linear code, as a function of a message authentication code (MAC) keyed using the joint key.

21. The method of claim 20, further comprising forming the predetermined number n of codewords as Shamir secret] shares of a Reed-Solomon code and encoding the vectors as the sum of respective ones of the secret shares and the message authentication code.

22. The method of claim 13, in which the predetermined criterion is that more than a minimum number of ordered element pairs in pairs of the vectors are identical and in which the minimum number is 2t−n, where t is a selectable threshold value and n is the number of elements in each vector.

23. The method of claim 13, in which the comparison value is determined by applying list decoding.

* * * * *